(12) United States Patent
Guichard et al.

(10) Patent No.: US 11,888,734 B2
(45) Date of Patent: Jan. 30, 2024

(54) MPLS EXTENSION HEADERS IN MIXED NETWORKS

(71) Applicant: Huawei Technologies Co., Ltd., Shenzhen (CN)

(72) Inventors: James N. Guichard, Hollis, NH (US); Haoyu Song, San Francisco, CA (US); Loa Andersson, Johanneshov (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 17/170,318

(22) Filed: Feb. 8, 2021

(65) Prior Publication Data

US 2021/0203599 A1   Jul. 1, 2021

Related U.S. Application Data

(63) Continuation of application No. PCT/CN2019/084813, filed on Apr. 28, 2019.

(60) Provisional application No. 62/815,633, filed on Mar. 8, 2019.

(51) Int. Cl.
 *H04L 45/50* (2022.01)
 *H04L 45/745* (2022.01)
 *H04L 69/22* (2022.01)

(52) U.S. Cl.
 CPC ......... *H04L 45/507* (2013.01); *H04L 45/745* (2013.01); *H04L 69/22* (2013.01)

(58) Field of Classification Search
 None
 See application file for complete search history.

(56) References Cited

U.S. PATENT DOCUMENTS

| 7,082,140 | B1 | 7/2006 | Hass |
| 11,201,820 | B2 * | 12/2021 | Song .................. H04L 45/34 |

(Continued)

FOREIGN PATENT DOCUMENTS

| CN | 105991437 A | 10/2016 |
| EP | 3288226 A1 | 2/2018 |
| WO | 2020181636 A1 | 9/2020 |

OTHER PUBLICATIONS

S. Previdi et al.,"IPv6 Segment Routing Header (SRH) draft-ietf-6man-segment-routing-header-10", Mar. 17, 2018, pp. 1-33.

(Continued)

*Primary Examiner* — Xavier S Wong
(74) *Attorney, Agent, or Firm* — Vierra Magen Marcus LLP

(57) ABSTRACT

A mixed Multiprotocol Label Switching (MPLS) network includes both extension header capable (EH capable) nodes and EH non-capable nodes. A first EH capable node receives advertised capabilities of a downstream node. These advertised capabilities indicate whether the downstream node is EH capable. The first EH capable node receives a packet to be transmitted to the downstream node via the MPLS network, and determines whether the packet includes an extension header (EH). The node inserts an EH label into an MPLS label stack of the packet after determining the advertised capabilities of the downstream node indicate that the downstream node is EH capable, and after determining the packet does not include the EH.

26 Claims, 6 Drawing Sheets

(56) References Cited

U.S. PATENT DOCUMENTS

| | | | |
|---|---|---|---|
| 2006/0013190 A1* | 1/2006 | Leroy | H04L 69/22 370/349 |
| 2008/0159288 A1* | 7/2008 | Nagarajan | H04L 45/38 370/392 |
| 2016/0119163 A1* | 4/2016 | Fadeev | H04M 15/8044 370/328 |
| 2018/0026880 A1 | 1/2018 | Nainar et al. | |

OTHER PUBLICATIONS

Office Action dated Feb. 7, 2022, Chinese Application No. 201980092218.5.

L. Andersson et al, MPLS Extension Header Architecture draft-andersson-mpls-eh-architecture-00, MPLS Working Group, Feb. 13, 2019, total 13 pages. XP015131081.

H. Song, Ed. et al, Options for MPLS Extension Header Indicator draft-song-mpls-eh-indicator-00, MPLS, Feb. 15, 2019, total 10 pages. XP015131124.

L. Andersson et al, MPLS Label Operations in MPLS EH capable networks draft-andersson-mpls-eh-label-stack-operations-00, MPLS Working Group, Feb. 20, 2019, total 15 pages. XP015131180.

Extended European Search Report dated Feb. 28, 2022, European Application No. 19919405.1.

\* cited by examiner

MPLS EXTENSION HEADERS IN MIXED NETWORKS

CROSS-REFERENCE TO RELATED APPLICATIONS

This application is a continuation of International Application No. PCT/CN2019/084813, filed Apr. 28, 2019, which claims the benefit of priority to U.S. Provisional Application Ser. No. 62/815,633, filed on Mar. 8, 2019, which are hereby incorporated by reference in their entirety.

TECHNICAL FIELD

This disclosure relates generally to MPLS extension headers (EHs), and more specifically to using MPLS EHs in networks including both EH capable and EH non-capable nodes

BACKGROUND

Multiprotocol Label Switching (MPLS) is a protocol that uses labels to route packets through the network along a predefined path, referred to as a Label Switched Path (LSP), with the packet being transmitted from one network node to the next in accordance with the labels, rather than requiring each network node to make its own routing decision based on an endpoint address. The labels are carried in short packet header fields, which are extracted by switching/forwarding network nodes, known as Label Switching Routers (LSRs). LSRs are preconfigured to associate certain MPLS labels with particular outgoing port(s) and hence traffic containing that label can be routed without a more detailed inspection of the packet header. This avoids the need for hop-by-hop routing decisions to be made on the IP layer network address, instead traffic is sent along a path predetermined by a particular set of labels.

MPLS uses Label Distribution Protocol (LDP), which associates a Forwarding Equivalence Class (FEC) with each LSP. LDP works with an MPLS label manager to manage associations between MPLS labels and corresponding FECs. The mapping between the MPLS label and the FEC is used to maintain tables that allow each LSR in the path to determine which actions to take with respect to a particular packet. Multiple MPLS labels can be included in a transmitted packet of data. These multiple MPLS labels form what is often referred to as an MPLS stack, or MPLS label stack.

MPLS label stacking allows implementation of MPLS tunneling, in which an outer transport label is used to establish a bulk LSP (which functions as a tunnel), often between edge devices of a network. Within each bulk LSP, inner transport labels are used to identify additional traffic flow for individual packets. Each packet can carry many label stack entries organized as a last-in-first-out stack. In normal forwarding across an MPLS network, a LSR processes only the top, i.e., outermost, label. Any LSR can add a header label to the stack by performing a "push" operation, or remove a header label from the stack by performing a "pop" operation. This stacking allows the aggregation of LSPs into a single LSP for a portion of the route, which creates a "tunnel".

While MPLS has provided many benefits over prior networking protocols, as well as over some newer network protocols, it was not specifically designed to support in-network services. In-network services, as the term is used herein, refers to functions, applications, or services applied by network devices (e.g., routers) on user traffic.

SUMMARY

In various embodiments presented herein, a packet switched communication network having Multiprotocol Label Switching (MPLS) capabilities includes both extension header capable (EH capable) nodes and EH non-capable nodes, and may be referred to herein as a "mixed" network. A first EH capable node, for example but not limited to an edge Label Switching Router (LSR), receives advertised capabilities of a downstream MPLS node. These advertised capabilities indicate whether the downstream node is EH capable. The first EH capable node receives a packet to be transmitted to the downstream node via the MPLS network, determines whether the packet includes an extension header (EH), and conditionally inserts an EH label into an MPLS label stack of the packet before sending the packet to the downstream node. In at least one embodiment, the first EH capable node inserts the EH label into the MPLS label stack after determining both of the following conditions exist: 1) the advertised capabilities of the downstream node indicate that the downstream node is EH capable; and 2) the packet does not include an EH. The EH label inserted into the packet can be used to assert to the downstream device that no EH is present in the packet.

In various embodiments, after determining the downstream node is EH capable, and the packet does include the EH, a standard label distribution protocol (LDP) label is inserted into the MPLS label stack of the packet.

Optionally, even after the first EH capable node determines that the downstream node is EH capable and the packet includes the EH, if it is determined that the EH does not apply to the downstream node, the first EH capable node can hide the EH from the downstream node by inserting, into the MPLS label stack, an EH label indicating that no EH is present in the packet.

In various embodiments of any of the above implementations, a standard label distribution protocol (LDP) label can be inserted into the MPLS label stack of the packet after determining the downstream node is EH non-capable, regardless of whether the packet includes the EH.

In at least one implementation, an EH capable node must scan the entire MPLS label stack to determine whether the packet includes an EH.

In any or all of the above embodiments in which the downstream node is an EH capable node, the first EH capable node can receive at least one message from the downstream node advertising dual forwarding equivalence class (FEC) labels. These dual FEC labels include a first FEC label indicating that the downstream node is capable of processing packets including standard LDP labels, and a second FEC label indicating that the downstream node is capable of processing packets including EH labels.

In any or all of the above embodiments in which the first EH capable node is downstream from an upstream EH capable node, the first EH capable node can transmit transmitting at least one message to the upstream EH capable node, the at least one message advertising dual forwarding equivalence class (FEC) labels.

In any or all of the above embodiments in which the first EH capable node is downstream from an upstream EH non-capable node, the first EH capable node can transmit a message advertising a single (FEC) label from the first EH capable node to the upstream EH non-capable node.

In any or all of the above embodiments, receiving advertised capabilities can include receiving the advertised capabilities from a network controller, or from the downstream node itself. Additionally, various embodiments insert the EH label into the MPLS label stack of the packet by using a forwarding equivalence class (FEC) label associated with the advertised capabilities of the downstream node as an index into a lookup table.

Various embodiments can be implemented as a Multiprotocol Label Switching (MPLS) network that includes a plurality of extension header capable (EH capable) Label Switching Routers (LSRs), and at least one EH non-capable LSR coupled to the plurality of EH capable LSRs. The first EH capable LSR is configured to receive an advertisement message indicating whether a downstream LSR is EH capable, and to receive a packet to be transmitted to the downstream LSR. The first EH capable LSR can determine whether the packet includes one or more extension headers (EHs), and conditionally insert an EH label into an MPLS label stack of the packet. Various components of the MPLS network can be configured to implement some or all of the methods and techniques discussed previously.

Similarly, various embodiments discussed herein can be implemented as an extension header capable (EH capable) Label Switching Router (LSR) including a processor and associated memory, and at least one interface coupled to the processor and associated memory, the at least one interface being configured to receive and transmit packets of data to other Label Switching Routers (LSRs) included in a Multiprotocol Label Switching (MPLS) network. The processor and associated memory can be configured to receive an advertisement message indicating whether a downstream LSR is extension header capable (EH capable), receive a packet to be transmitted to the downstream LSR, determine whether the packet includes one or more extension headers (EHs), and conditionally insert an EH label into an MPLS label stack of the packet depending on the capabilities of the downstream LSR and on whether the packet includes one or more EHs. The EH capable LSR can be can be configured to implement some or all of the methods and techniques discussed above.

BRIEF DESCRIPTION OF THE DRAWING(S)

DETAILED DESCRIPTION

As discussed herein, various embodiments of the present disclosure allow multiprotocol label stack (MPLS) extension headers (EHs) to be used in a mixed network. As used herein, the term "extension header (EH)" refers to a data encapsulation mechanism that provides a generic way to encapsulate in-network service headers and metadata into MPLS packets. The term, "mixed networks" is used herein to refer to MPLS networks including both EH capable and EH non-capable nodes, e.g. Label Switching Routers (LSRs), to transmit data packets.

Currently, not all MPLS devices are capable of processing data packets that include EHs. But because, EHs provide MPLS devices with the ability to provide various in-network services, various MPLS devices according to the present disclosure include EH processing functionality. These newer devices are referred to herein as "EH capable," because they are able to process EHs. The older, legacy devices are referred to herein as "EH non-capable," because they cannot process EHs. Both EH capable and EH non-capable devices can advertise their capabilities to other MPLS nodes using mechanisms established by various standards and proposed standards propagated by the Internet Engineering Taskforce (IETF) and International Telecommunication Union Telecommunication Standardization Sector (ITU-T).

When an MPLS packet includes one or more EHs, an EH label is inserted into the MPLS label stack. For backwards compatibility with EH non-capable devices, EH labels are inserted at the bottom of the MPLS label stack, so that the EH headers do not interfere with proper operation of the EH non-capable devices. Inserting the EH headers at the bottom of the MPLS label stack allows EH capable devices to take advantage of network service functionality provided by EHs, without interfering with the proper operation of EH non-capable devices. But putting the EH label at the bottom of the MPLS label stack effectively imposes a processing penalty on EH capable devices.

As a practical matter, not every MPLS packet will include an EH, but with EH headers at the bottom of the MPLS label stack, an EH capable node must scan the entire MPLS label stack of every packet to determine whether that packet includes an EH label (and therefore an EH). Putting EH labels towards the beginning of the MPLS label stack would allow EH capable devices to quickly determine whether an EH is included in any particular packet, but then EH non-capable devices would not be able to process the packets, Various methods, devices, and systems disclosed herein, however, reduce or eliminate the penalty incurred due to placement of EH labels at the bottom of the MPLS stack, while still preventing the presence of EHs in a packet from interfering with the operation of EH non-capable devices.

Figure 1:
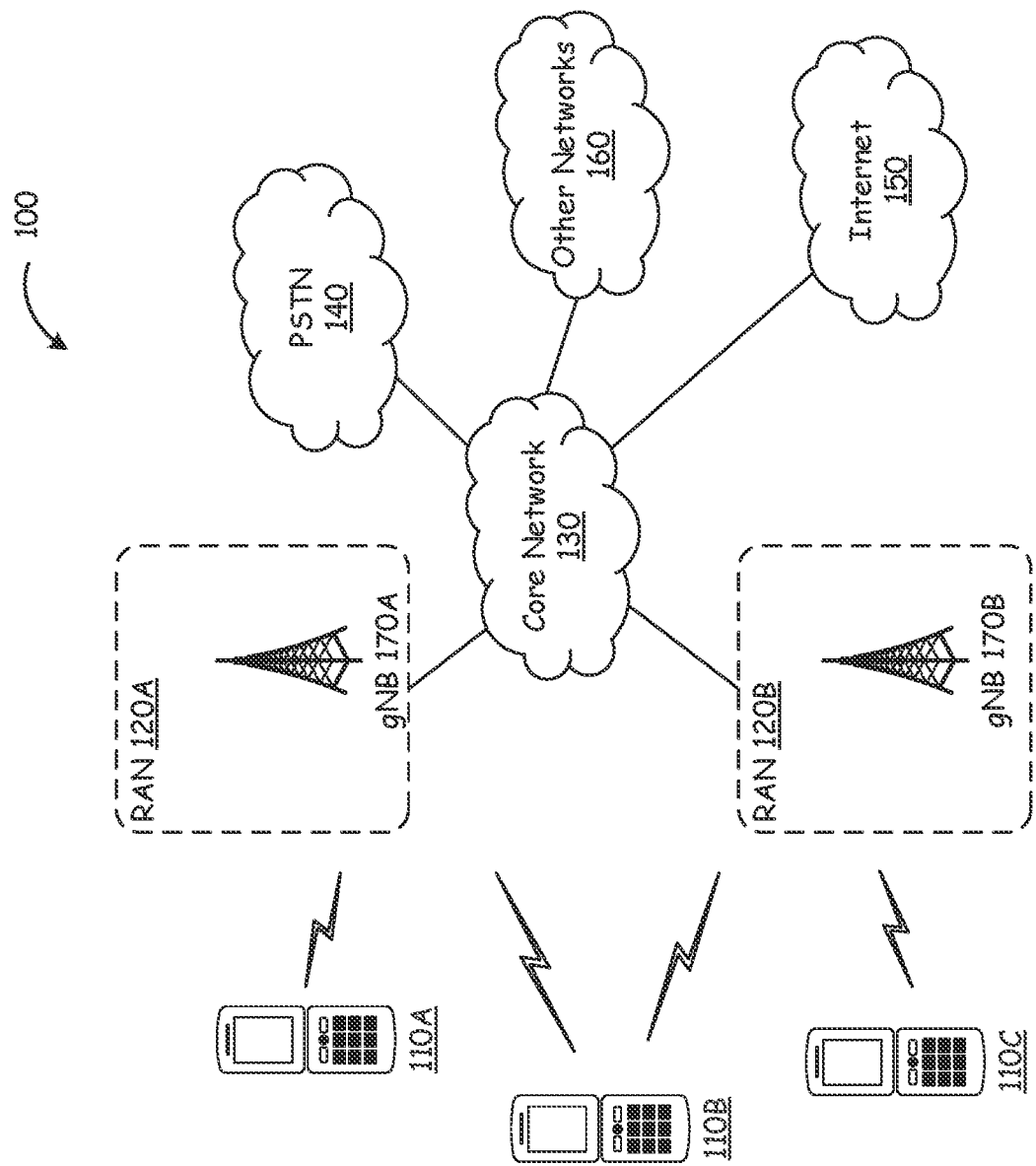
FIG. 1 is a diagram illustrating a communication system, in accordance with various embodiments of the present disclosure.

FIG. 1 illustrates an exemplary communication system 100 with which embodiments of the present technology can be used. The communication system 100 includes, for example, user equipment 110A, 110B, and 110C, radio access networks (RANs) 120A and 120B, a core network 130, a public switched telephone network (PSTN) 140, the Internet 150, and other networks 160. Additional or alternative networks include private and public data-packet networks, including corporate intranets. While certain numbers of these components or elements are shown in the figure, any number of these components or elements may be included in the system 100.

In one embodiment, the communication system 100 can include a wireless network, which may be a fifth generation (5G) network including at least one 5G base station which employs orthogonal frequency-division multiplexing (OFDM) and/or non-OFDM and a transmission time interval (TTI) shorter than 1 milliseconds (e.g. 100 or 200 microseconds), to communicate with the communication devices.

System 100 enables multiple users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

User equipment (UE) 110A, 110B, and 110C, which can be referred to individually as an UE 110, or collectively as the UEs 110, are configured to operate and/or communicate in the system 100. For example, an UE 110 can be configured to transmit and/or receive wireless signals or wired signals. Each UE 110 represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, RANs 120A, 120B include one or more base stations (BSs) 170A, 170B, respectively. RANs 120A and 120B can be referred to individually as a RAN 120, or collectively as the RANs 120. Similarly, base stations (BSs) 170A and 170B can be referred to individually as a base station (BS) 170, or collectively as base stations (BSs) 170. Each of the BSs 170 is configured to wirelessly interface with one or more of the UEs 110 to enable access to core network 130, PSTN 140, Internet 150, and/or other networks 160. For example, base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), a server, a router, a switch, or other processing entity, node or device included in a wired or wireless network.

In one embodiment, the BS 170A forms part of the RAN 120A, which may include one or more other BSs 170, elements, and/or devices. Similarly, the BS 170B forms part of the RAN 120B, which may include one or more other BSs 170, elements, and/or devices. Each of the BSs 170 operates to transmit and/or receive wireless signals within a particular geographic region or area, sometimes referred to as a "cell." In some embodiments, multiple-input multiple-output (MIMO) technology may be employed having multiple transceivers for each cell.

The BSs 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the BSs 170 and UEs 110 are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120 are in communication with the core network 130 to provide the UEs 110 with voice, data, application, Voice over Internet Protocol (VoIP), or other services. As appreciated, the RANs 120 and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

The RANs 120 may also include millimeter and/or microwave access points (APs). The APs may be part of the BSs 170 or may be located remote from the BSs 170. The APs may include, but are not limited to, a connection point (an mmW CP) or a BS 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of UEs, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDAs, iPads, Tablets, mobile terminals, smart phones, laptop embedded equipped (LEE), laptop mounted equipment (LME), and USB dongles.

One or more of the networks 130, 140, 150 and/or 160 (or portions thereof) can utilize Multiprotocol Label Switching (MPLS), which is a type of data-carrying technique for high-performance telecommunications networks. In other words, one or more of the networks 130, 140, 150 and/or 160 can be or can include an MPLS network.

MPLS directs data from one network node to the next based on short path labels rather than long network addresses, avoiding complex lookups in a routing table. The labels identify virtual links (paths) between distant nodes rather than endpoints. MPLS can encapsulate packets of various network protocols, hence its name "multiprotocol." MPLS supports a range of access technologies, including T1/E1, asynchronous transfer mode (ATM), Frame Relay (FR), and data subscriber line (DSL), just to name a few.

MPLS was originally conceived to improve the packet forwarding performance of Internet Protocol (IP) routers. However, it has subsequently been extended to carry other layer network technologies (like Asynchronous Transfer Mode (ATM), Frame Relay (FR), Plesiochronous Digital Hierarchy (PDH), etc.) by the use of Pseudowire (PW) encapsulation techniques.

Figure 2:
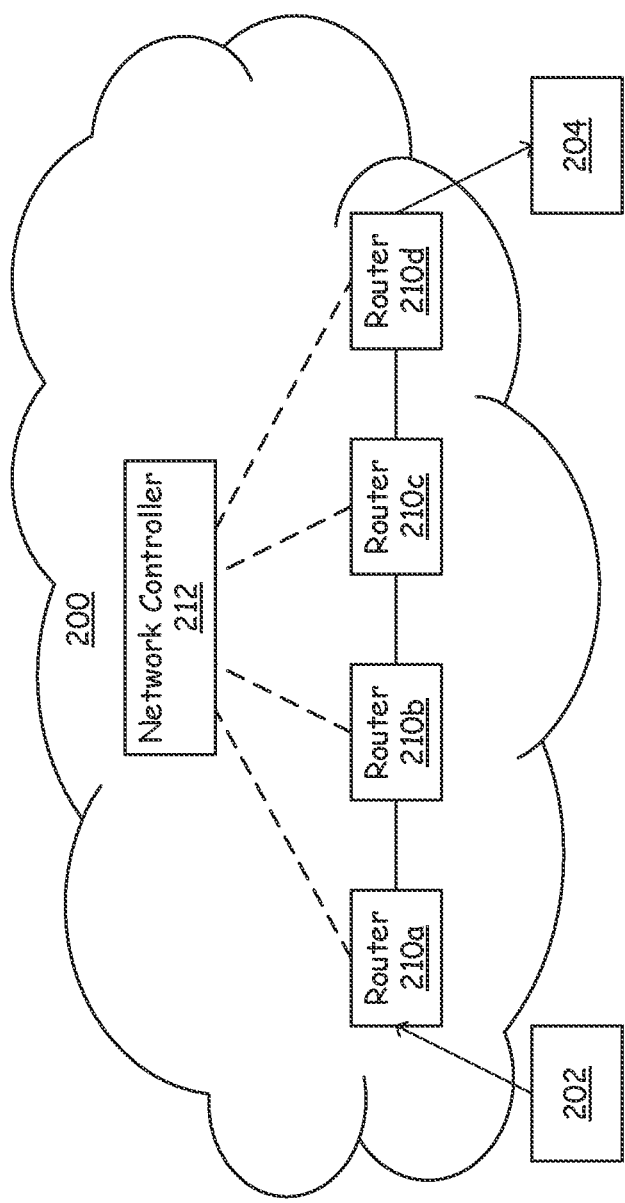
FIG. 2 is a block diagram illustrating an MPLS network, which may be or be included in one of the networks shown in FIG. 1, in accordance with various embodiments of the present disclosure.

FIG. 2 illustrates an exemplary MPLS network 200 that includes multiple nodes, such as routers 210a, 210b, 210c, and 210d, each of which can be referred to as a router 210, or which can be collectively referred to as the routers 210. While only four routers 210 are shown in FIG. 2, an MPLS network generally include significantly more than four routers 210. Each of the routers 210 can also be referred to more generally as a node of the MPLS network 200. FIG. 2 also shows how the MPLS network 200 can be used to transport one or more packets from a first device 202 to a second device 204, both of which are communicatively coupled to the MPLS network 200. FIG. 2 also illustrates a network controller 212 that is communicatively coupled to each of the routers 210 of the MPLS network 200, as represented in dashed lines. The network controller 212 can be used to perform a variety of control path and/or control plane functions. The control plane of MPLS network 200 is the part of the router architecture responsible for collecting and propagating the information that will be used later to forward incoming packets. Routing Protocols and label distribution protocols are parts of the control plane. The control plane is responsible for exchanging layer 3 routing information and labels. By contrast, a data plane of an MPLS network is responsible for forwarding packet based on labels and IP header. The data plane can have a simple forwarding engine that maintains a Label Forwarding Information Base (LFIB), which is a table a router uses to forward labelled packets through a network, and a Forwarding Information Base (FIB), which is a table that a router looks at when deciding where to forward traffic.

As noted above, the router 210 can also be referred to as a node of the MPLS network 200. When the MPLS network 200 is used to transfer one or more packets from the first device 202 to the second device 204, the router 210a can be more specifically referred to as an ingress router or ingress node, and the router 210d can be more specifically referred to as an egress router or egress node. Even more specifically, the ingress router 210a can be referred to as a Label Edge Router (LER), which is a router that first encapsulates a packet inside an MPLS Label Switched Path (LSP), wherein the MPLS LSP is essentially a unidirectional tunnel between a pair of routers of an MPLS network. The router 210d can be referred to more specifically as the egress router. The routers 210b and 210c can be referred to more specifically as Label Switching Routers (LSRs) or transit nodes, which are routers that perform MPLS switching in the middle of an LSP. The router 210d, which as noted above can be referred to as the egress node, is the final router at the end of the LSP. Ingress router 210a and egress router 210d are also LSRs, but may perform additional functions by virtue of their placement at the edges of the MPLS network.

When an unlabeled packet enters the ingress router (e.g., 210a in FIG. 2) and needs to be passed on to an MPLS tunnel, the router first determines the forwarding equivalence class (FEC) for the packet and then inserts one or more labels in the packet's newly created MPLS header, which can also be referred to as an MPLS label stack. The packet is then passed on to the next hop router for this tunnel. An MPLS header includes a stack of one or more MPLS label stack entries, and thus, an MPLS header can also be referred to as an MPLS label stack.

An MPLS header can be added between the network layer header (i.e., the layer 3 header) and the link layer header (i.e., the layer 2 header) of the Open Systems Interconnection model (OSI model). Because MPLS often operates at the layer that is generally considered to lie between the traditional definitions of OSI Layer 2 (data link layer) and Layer 3 (network layer), MPLS is sometimes referred to as a layer 2.5 protocol. MPLS was designed to provide a unified data-carrying service for both circuit-based clients and packet-switching clients which provide a datagram service model. MPLS can be used to carry many different kinds of traffic, including IP packets, as well as native ATM, SONET, and Ethernet frames. Is it also possible that an MPLS header can be added between other layers of the OSI model, besides between layers 2 and 3.

When a labeled packet is received by an MPLS router (e.g., 210b or 210c in FIG. 2), the topmost label is examined. Based on the contents of the label a swap, push (impose), or pop (dispose) operation is performed on the packet's MPLS label stack. As will be described in additional detail below, an MPLS label stack includes multiple label stack entries. Routers (e.g., 210 in FIG. 2) can have prebuilt lookup tables that tell them which kind of operation to perform, based on the topmost label of the incoming packet so they can process the packet very quickly. In a swap operation the label is swapped with a new label, and the packet is forwarded along the path associated with the new label. In a push operation a new label is pushed on top of the existing label, effectively "encapsulating" the packet in another layer of MPLS. This allows hierarchical routing of MPLS packets. Notably, this is used by MPLS virtual private networks (VPNs). In a pop operation, the label is removed from the packet, which may reveal an inner label below. This process is called "decapsulation". If the popped label was the last on the label stack, the packet "leaves" the MPLS tunnel.

During the above described operations, the contents of the packet below the MPLS Label stack are not examined. Indeed, transit routers, also referred to as LSRs, typically need only to examine the topmost label on the stack. The forwarding of the packet is done based on the contents of the labels, which allows "protocol-independent packet forwarding" that does not need to look at a protocol-dependent routing table and avoids an expensive IP longest prefix match at each hop.

At the egress router (e.g., 210d in FIG. 2), when the last label has been popped, only the payload remains. This can be an IP packet, or any of a number of other kinds of payload packet. The egress router must, therefore, have routing information for the packet's payload, since it must forward it without the help of label lookup tables. An MPLS transit router (e.g., 210b and 210c in FIG. 2) has no such requirement.

Usually (by default with only one label in the stack, accordingly to the MPLS specification), the last label is popped off at the penultimate hop (the hop before the egress router). This is called penultimate hop popping (PHP). By using PHP, transit routers connected directly to this egress router effectively offload it, by popping the last label themselves. In the label distribution protocols, this PHP label pop action is advertised as reserved or special-purpose label value 3 "implicit-null" (which is never found in a label, since it means that the label is to be popped).

In various embodiments, one or more of router 210a, 210b, 210c, or 210d are extension header incapable (EH incapable), while at least two other routers are extension header non-capable (EH non-capable), and the above described process applies to both EH capable and EH non-capable routers. One of the differences between EH capable and EH non-capable (e.g. legacy) routers is that when an EH capable router encounters an EH label, it is capable of interpreting the EH label, and accessing metadata and performing functions specified by an EH header associated with the EH label, while EH non-capable routers cannot.

As discussed in greater detail below, EH capable routers include additional functionality that allow them to conditionally insert an EH label, at or near the top of the MPLS label stack of a packet, during transport through an MPLS network. The decision regarding insertion of the EH label depends in part on the advertised capabilities of the node immediately downstream of the current node. That is to say, whether or not a particular EH capable node inserts an EH label near the top of the MPLS label stack depends, at least in part, on whether the next node along the network path is EH capable or EH non-capable.

Figure 3:
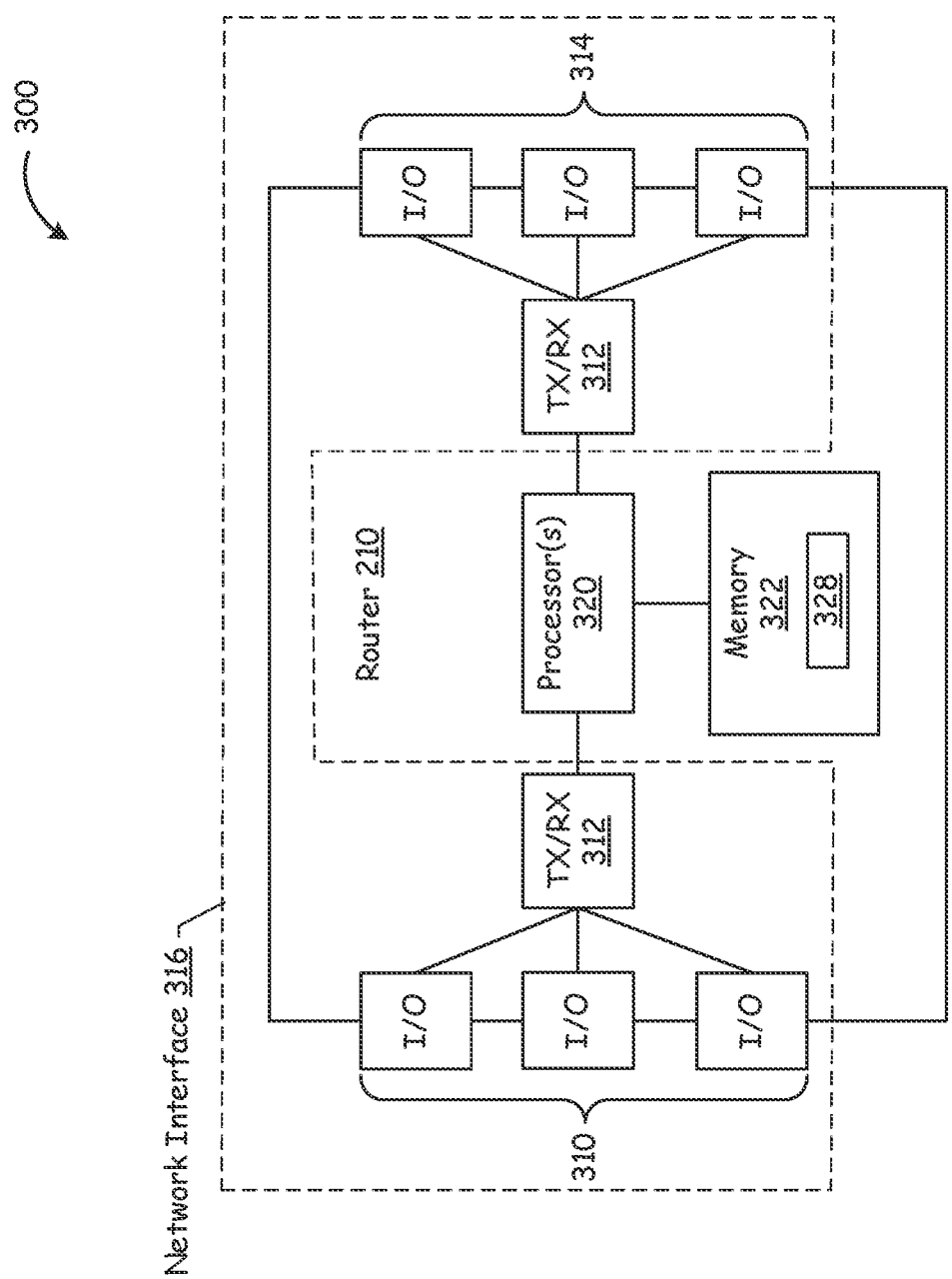
FIG. 3 is a schematic diagram illustrating details of a router of an MPLS network, such as the MPLS network shown in FIG. 2, in accordance with various embodiments of the present disclosure.

FIG. 3 is a schematic diagram illustrating exemplary details of a router 210, or more generally a network node 300, according to an embodiment. The router 210 can be configured to implement or support embodiments of the present technology disclosed herein. The router 210 may comprise downstream ports 310, transceivers (TX/RX) 312, memory 322, one or more processor(s) 320, and upstream ports 314. The ports 310 and 314 and the transceivers 312 can be collectively referred to as a network interface 316 that is configured to receive and transmit packets over an MPLS network.

The memory 322 may include a data packet modifying and forwarding block 328 that may be implemented on the processor(s) 320. The data packet modifying and forwarding block 328 may be used to implement embodiments of the present technology described herein. Alternatively, the data packet modifying and forwarding block 328 may be implemented directly on at least one of the processor(s) 320. The data modifying and packet forwarding block 328 may be used to modify data packets and route data packets using routing information within the data packets. More specifically, the processor(s) 320 can be configured to implement embodiments of the present technology described below. In accordance with certain embodiments, the memory 322 stores computer readable instructions that are executed by the processor(s) 320 to implement embodiments of the present technology. It would also be possible for embodiments of the present technology described below to be implemented, at least partially, using hardware logic components, such as, but not limited to, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc.

Figure 4:
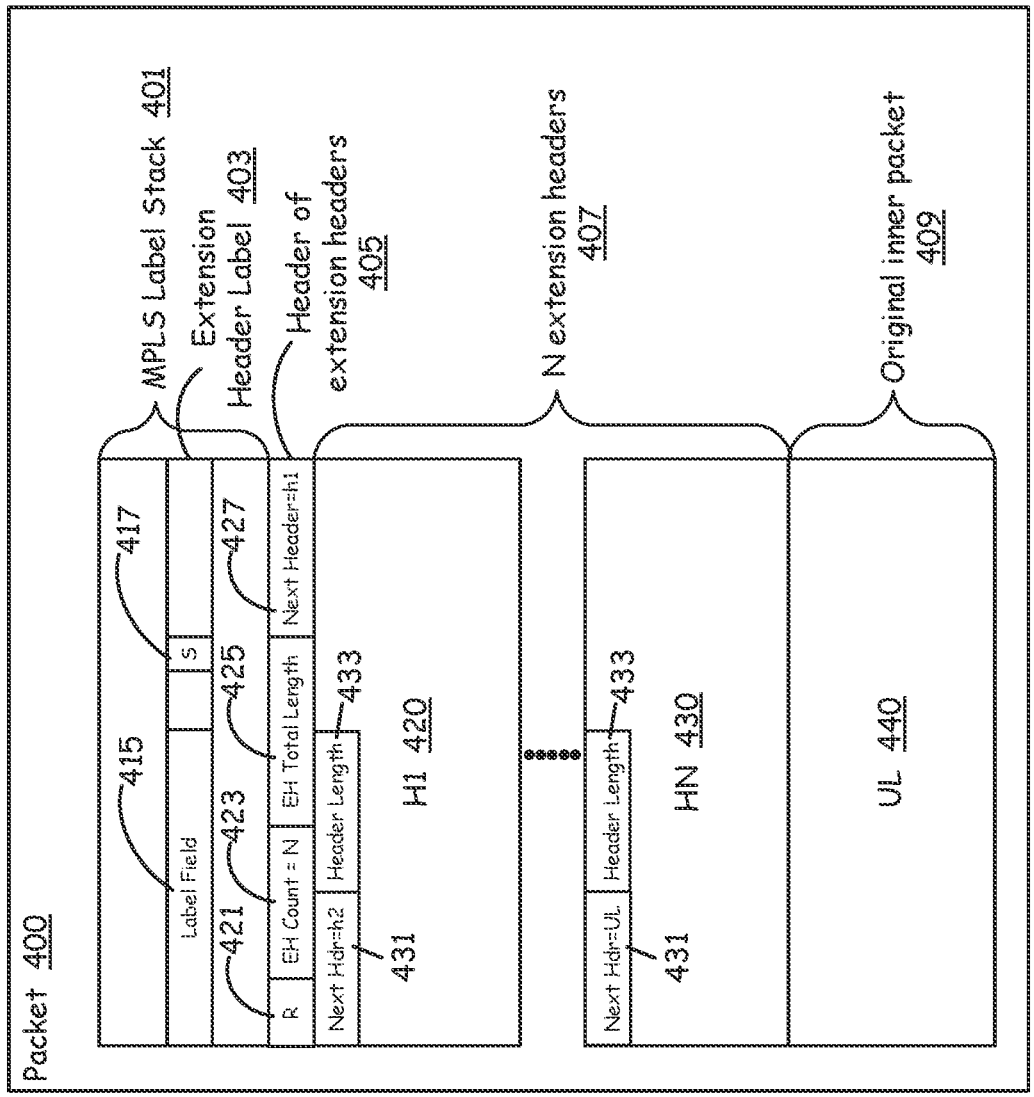
FIG. 4 is a diagram of an MPLS packet including extension headers, in accordance with various embodiments of the present disclosure.

Referring next to FIG. 4, a diagram of an MPLS packet 400 including extension headers, will be discussed in accordance with various embodiments of the present disclosure. MPLS packet format 400 includes an original inner packet 409, which includes an original payload and upper layer protocol data UL 440. UL 440 can include a Transmission Control Protocol (TCP) header (not explicitly illustrated), and a layer 3 (i.e., network layer) header (not explicitly illustrated), such an IPv4 or IPv6 header. The contents of original inner packet 409 are not limited to the items discussed in this example.

The MPLS packet 400 is also shown as including an MPLS label stack 401, which can also be referred to as an MPLS header, a Header of Extension Headers (HEH) 405, and multiple (i.e., N) Extension Headers 405, including extension header H1 420 through HN 430. Embodiments of the present technology enable different multiple EHs of different types to be stacked one above the other in a manner that enables multiple in-network services to be added to an MPLS network. The presence (or lack of presence) of these EHs can be indicated by an EH label 403 that is conditionally inserted into an MPLS label stack, based on the advertised capabilities of a downstream node.

The MPLS label stack 401 can include MPLS label stack entries, including extension header label (EH label) 403. Although FIG. 4 shows EHL 403 in the middle of MPLS label stack 401, EH label 403 can be placed elsewhere within MPLS label stack 401 to facilitate backward compatibility in mixed EH capable and EH non-capable networks. In various embodiments discussed herein, an original EH label can be placed at the bottom of MPLS label stack 401 for backward compatibility with EH non-capable devices.

Although packet 400 is illustrated as including an EH, only a subset of packets is likely to include an EH. There are ways to indicate the presence or absence of extension headers (EHs) in packet 400. MPLS technology includes the concept of Forwarding Equivalence Class (FEC). The FEC associated with an LSP specifies which packets are "mapped" to that LSP. It is possible to create an FEC that indicates no EH is present in the packet. A node receiving packets on a label associated with this FEC will know that no EH is present in the packet, i.e. an upstream node sending packets using the "no EH present" FEC provides notice to a downstream EH capable node that it is unnecessary to scan the entire MPLS stack to find an EH that needs to be processed by that node, because no EH is included in packet 400.

A label stack entry in an MPLS label stack 401 includes, four different information elements, a label value field (20 bits) 415, a Traffic Class (TC) field (not illustrated), a single bit that indicates if the label stack entry is at the Bottom of Stack (BoS) 417, and an eight bit TTL (not illustrated). Each label value can be a forwarding label that tells the next router in a Label Switched Path (LSP) which interface to use for sending the packet, and which label to put on top of the packet when the packet is forwarded. It is also possible that one or more label values can be a Special Purpose Label (SPL). The allocated SPL values shown in Table 1, below.

TABLE 1

| Value | Description |
| --- | --- |
| 0 | Ipv4 Explicit NULL Label |
| 1 | Router Alert Label |
| 2 | Ipv6 Explicit NULL Label |
| 3 | Implicit NULL Label |
| 4-6 | Unassigned |
| 7 | Entropy Label Indicator (ELI) |
| 8-12 | Unassigned |
| 13 | GAL Label |
| 14 | OAM Alert Label |
| 15 | Extension Label |

The MPLS working group of the Internet Engineering Task Force (IETF) is responsible for standardizing MPLS related technologies. The MPLS working group has reserved sixteen label values as Special Purpose (SPL) labels, also known as base SPLs. The SPLs are viewed as a scarce resource, and are running out fast. To address this scarcity, the MPLS working group has created a second set of Special Purpose Labels-Extended SPLs (eSPLs). The range of the eSPLs are fully 20 bits (approximately 1 million labels). Currently only eSPL values from 16 to 255 are in use. The format is that an Extension Label (value 15) is followed by an eSPL value. There are several ways to indicate the presence of an EH after the label stack, it is possible, but unlikely, that one of the unassigned base SPLs could be used, but an extended SPL could be used. There are also other MPLS techniques that could be used, e.g. a Generic Associated Channel (GAL) dedicated for EHs could be created. The common denominator is that there needs to be information in the label stack (a label stack entry) that indicates the presence of EHs after the label stack.

When a labelled packet is received by an LSR, the label value at the top of the MPLS label stack is first processed to look up forwarding information. This allows the receiving LSR to learn the port to which the packet can be forwarded, and/or to learn any operation(s) to be performed on the MPLS stack before forwarding. Examples of operations an LSR performs on an MPLS stack include replacing the top label stack entry with another value (swap), popping an entry off the label stack (pop), or pushing one or more additional entries onto the MPLS label stack (push), as was discussed above. Other operations an LSR can perform include learning the outgoing data link encapsulation and any other information needed to properly forward the packet.

Depending on the label value assigned to the MPLS label field and other fields in an MPLS label stack entry, the label field can be interpreted in several ways by a receiving LSR. The label field can function, for example, as a forwarding label, as a source label, or as a functional label to indicate an operation that the LSR must perform.

When used as a forwarding label the label value field of the MPLS label stack entry functions as a proxy identifier for the "address" of the LSP destination end-point. In the case where this MPLS label stack entry is at the top of a stack of LSP MPLS headers, S=0. If it is, however, the sole MPLS label stack entry in the stack, then S=1. When used as a forwarding label, the label value field of the MPLS label stack entry is used to forward the MPLS traffic unit in the data plane towards the destination on a hop-by-hop basis, except when penultimate-hop-popping (PHP) is used, in which case the forwarding header is removed completely on the last hop.

When used as a source label, the label value field functions as a proxy identifier for the "address" of the LSP source end-point. This functional use of a labelled header means it will invariably be the last entry in a stack of MPLS label stack and so the S bit will be set to 1. When used as a functional label, the label value field identifies a specific action that needs to be taken when received at an LSR. As is known in the art, the reserved values for the label field of the MPLS header specify specific functions which an LSR is to perform on a received packet. For example, label 14 of Table 1 indicates a router Operation and Maintenance (OAM) alert to pass the contents of the traffic unit to the control/management plane for further action. In such a labelled header the S bit will usually be set to 1 (but this may not always be the case with other functional uses).

While conventional MPLS implementations have provided many benefits over prior networking protocols, as well as over some newer network protocols, it would be beneficial if MPLS could support multiple in-network services. In other words, a technical problem with MPLS is that it was not designed to support in-network services, such as, but not limited to, Network Service Header (NSH), In-situ Operations, Administration, and Maintenance (IOAM), Segment Routing (SR), and network programming. "In-network services," as the term is used herein, refers to functions, applications, or services applied by network devices (e.g., routers) on user traffic. Such in-networks services are usually performed by adding some header to the user packets, with the header encoding the necessary information for the service. The header is usually removed before the user packet is delivered to the destination so that it is agnostic to end users. Embodiments of the present technology, as will be described in additional detail below, can be used to add one or more in-network services to an MPLS network that does not otherwise support such in-network service(s).

The MPLS standard does not currently support multiple in-network services, but rather, can at best support only a single network service. Further, in order to support a single network service, the current MPLS standard requires full label stack scanning, which can adversely affect network performance. Additionally, the current MPLS standard does not provide a way for an EH capable node to avoid the "full stack scanning" penalty that can be incurred in mixed MPLS networks including EH capable and EH non-capable nodes.

Embodiments of the present technology, described herein, can be used to overcome the above noted technical problem(s) with MPLS, in particular by reducing the need for every EH capable node in a mixed network to perform a full scan of the MPLS label stack to identify extension headers (EHs). Various embodiments of the present technology described herein can be used to improve an MPLS network's ability to support multiple in-network services, such as, but not limited to, Network Service Header (NSH), In-situ Operations, Administration, and Maintenance (IOAM), Segment Routing (SR), and network programming. Beneficially, embodiments of the present technology can enable multiple in-network services to be stacked together. Furthermore, embodiments of the present technology provide for backwards compatibility, if needed, e.g., in mixed networks including legacy (EH non-capable) routers that have not yet been updated to specifically function in accordance with the technology described herein. Further, certain embodiments of the present technology can be used to avoid or minimize the need for deep label stack scanning, which if not avoided can degrade performance by increasing latency. More specifically, certain embodiments of the present technology described herein are related to MPLS Extension Headers that provide for generic, scalable, high performance and future proof solutions to the above noted technical problems with MPLS.

In accordance with certain embodiments, EH label 403 is used to indicate that one or more extension headers (EHs) are included in packet 400. In the embodiment shown, a Header of the Extension Header(s) (HEH) 405 is included between the MPLS Label Stack 401 (which can also be referred to as the MPLS Header 401) and the N Extension Header(s) 407, where N is an integer that is equal to or greater than 1.

Depending upon the specific MPLS implementation, as well as whether all the routers in a specific MPLS network have been updated to correctly identify and utilize the EH label 403, the EH label can be included in any location in the MPLS Label Stack 401.

If EH label 403 is included at the very top of the MPLS Label Stack 401, then the EH label can be quickly identified by an EH capable router that receives packet 400. However, in order for the EH label of a label stack entry to be placed at the top of the MPLS Label Stack 401, all routers within an MPLS network that may transport such a datagram would need to be EH capable routers, i.e. updated to be able to interpret and use MPLS Extension Headers 407. Otherwise, a router that has not been updated to identify the EH label and use MPLS Extension Headers, i.e. an EH non-capable router, would likely drop packet 400, so that the original inner packet 409 might never make it to its intended destination.

In general, EH label 403 can be included in any location in the MPLS Label Stack 401, as noted above. However, in order for the use of the EH label to be backwards compatible with legacy routers used in mixed networks, i.e. EH non-capable routers, the EH label should be located at the bottom of the MPLS Label Stack 401.

The Header of the Extension Header(s) (HEH) 405 is shown as including four header fields, including a Reserved (R) field 421, an Extension Header Count (EH Count) field 423, an EH Total Length field 425, and a Next Header Type (NHT) field 427. The Next Header Type (NHT) field 427 can also be referred to more succinctly as the Next Header (NH) field 427. The specific order of the fields 421, 423, 425, and 427 of the HEH 405 is shown in FIG. 4, this for example purposes only, and actual order of the fields 421, 423, 425, and 427 is not limited to the order shown in FIG. 4. The HEH 405 can also be referred to as the Extension Header(s) Header (EHH) 405, since it essentially a header for the Extension Header(s) 407. A particular sequence of MPLS Extension Headers 407 can be referred to as an MPLS Extension Header list.

The Reserved (R) field 421 of the HEH 405 includes one or more bits (e.g., 4 to 6 bits) that are reserved for future use, and in certain embodiments can be eliminated. The EH Count field 423 includes multiple bits (e.g., 8 bits), which are used to specify the total number of Extension Headers 407 that follow the HEH 405. The EH Total Length field 425 includes multiple bits (e.g., 8 or 16 bits), and is used to specify total length of the Extension Headers 407. The value included within the EH Total Length field enables a router or other device to jump directly to the original inner packet 409 that follows the N Extension Headers 407 if desired.

The Next Header Type (NHT) field 427 includes multiple bits (e.g., 8 bits) that are used to indicate the type of header that is included in the next Extension Header or other next header. Examples of next header types that may be specified by the NHT field 427 include, IOAM, NSH, and SR, but are not limited to those types. The NHT field 427 enables a router or other device to know how to interpret and use the next Extension Header or other type of header within packet 400. The total length of the Header of the Extension Header(s) 405 can be the same length as each label stack entry (e.g., 32 bits), or shorter or longer than the length of one or more label stack entries (i.e., less than or greater than 32 bits).

In accordance with certain embodiments, values included in the EH Count field 423 are zero-based numbering values, in which a value of "0" means that there is one Extension Header 407 that follow the Header of the Extension Header(s) 405, a value of "1" means that there are two Extension Headers 407 that follow the Header of the Extension Header(s) 405, and so forth. Similarly, the value included in the EH Total Length field 425 can also be a zero-based numbering value. In alternative embodiments, the values included the EH Count field 423 and/or the EH Total Length field 425 need not be zero-based numbering values.

Each Extension Header 407 includes a Next Header Type (NHT) field 431, which is similar to the NHT field 427 included in the Header of the Extension Header(s) 405, in that it indicates the type of the next header. The next header can be an Extension Header 407, or some other type of header, such as a network layer header within the original inner packet 409. As noted above, exemplary types of next headers that can be specified by the NHT field 431 includes Network Service Header (NSH), In-situ Operations, Administration, and Maintenance (IOAM), Segment Routing (SR), and network programming, but are not limited thereto. Other next header types that can be specified by the NHT field 427 include, but are not limited to, IPv4, IPv6, none, and unknown.

Each Extension Header 407 also includes a Header Length field 433, which specifies the length of the individual Extension Header. The Header Length field 433 enables a router to jump to the next header included in a datagram, if desired. Each NHT field 431 can be 8 bits, or some other number of bits, depending upon implementation. Each Header Length field 433 can be 8 bits, or some other number of bits, depending upon implementation. Each Extension Header 407 the NHT field 431 is shown as being located before the Header Length field 433, but this order can be reversed. In various embodiments, each Extension Header 407 can include one or more additional fields.

The data fields and associated formats of the remaining portion of each respective Extension Header 407 are dependent upon the type of header. For example, if Extension Header 407 has a type of IOAM, then the data fields and associated format of the remaining portion of the Extension Header 407 may be in accordance with the standard for IOAM specified by the IETF. For another example, if the Extension Header 407 is of the type NSH, then the data fields and associated format of the remaining portion of the Extension Header 407 may be in accordance with the standard for NSH specified by the IETF.

In accordance with certain embodiments, the NHT field can have two special values, including a NONE value, and an UNKOWN value. The NONE value means that there is no header and no payload following the header (i.e., there is no original inner packet 409 following the Extension Header 407) that includes the NHT field having the NONE value. The UNKNOWN value means that the type of header in the next header or payload is unknown. The special UNKOWN value provides for compatibility with the original MPLS protocol design.

In various embodiments, Forward Equivalent Class (FEC) can be used to indicate whether MPLS Extension Header(s) follow the MPLS Label Stack. Forwarding Equivalence Class (FEC) is a term used in MPLS to describe a set of packets with similar or identical characteristics which may be forwarded the same way, i.e., packets assigned to the same FEC may be bound to the same MPLS label. More specifically, an FEC is a set of packets that a single router forwards to the same next hop, out the same interface (e.g., the same upstream port), with the same treatment (such as queuing). When using FEC to indicate the existence of Extension Header(s), for each forwarding next hop within an MPLS network, one of two potential label values (corresponding to the same next hop) can be assigned by a router and included in the label value field of a label stack entry. The two label options (e.g., labels A and B) would have the same forwarding behavior, but only one of the two labels would specify that there is/are one or more Extension Header(s) in this MPLS data packet or datagram that should be processed. In other words, if there is no Extension Header in the packet or datagram being forwarded by the router, then a first one of the two label values (e.g., label A) is included in a label stack entry; and if there is/are one or more Extension Headers in the packet or datagram being forwarded (as added by the router, or by some other router), then a second one of the two label values (e.g., label B) is included in the label stack entry. The next hop router that receives that packet could then determine whether or not there is/are Extension Header(s) in the packet it receives based on whether the first or second label value (label value A or B) is included in the label value filed of a label stack entry.

In at least one embodiment, label A can be an EH label inserted by an EH capable device that indicates to other EH capable devices that there are no extension headers (EHs) included in the packet being transmitted. Since the EH capable device knows that there are no EHs it needs to process, the device does not need to scan the entire MPLS label stack looking for EH labels, and can save processing time. By contrast, label B can be used to indicate that an EH is, or may be, present in the packet being transmitted. The label B can be, for example, a standard LDP label used by EH non-capable MPLS devices. When an EH capable device encounters label B in a packet, the EH capable device assumes that an extension header is, or may be, present in the packet, and will scan the entire MPLS label stack looking for the EH.

Label B can, however, serve the additional purpose of providing backward compatibility with EH non-capable devices. Using this combination of a standard LDP label and an EH label indicating that there is no EH present, can be used to allow at least some EH capable devices operating with EH non-capable devices in a mixed network to avoid having to fully scan the MPLS label stacks of each and every packet.

Figure 5:
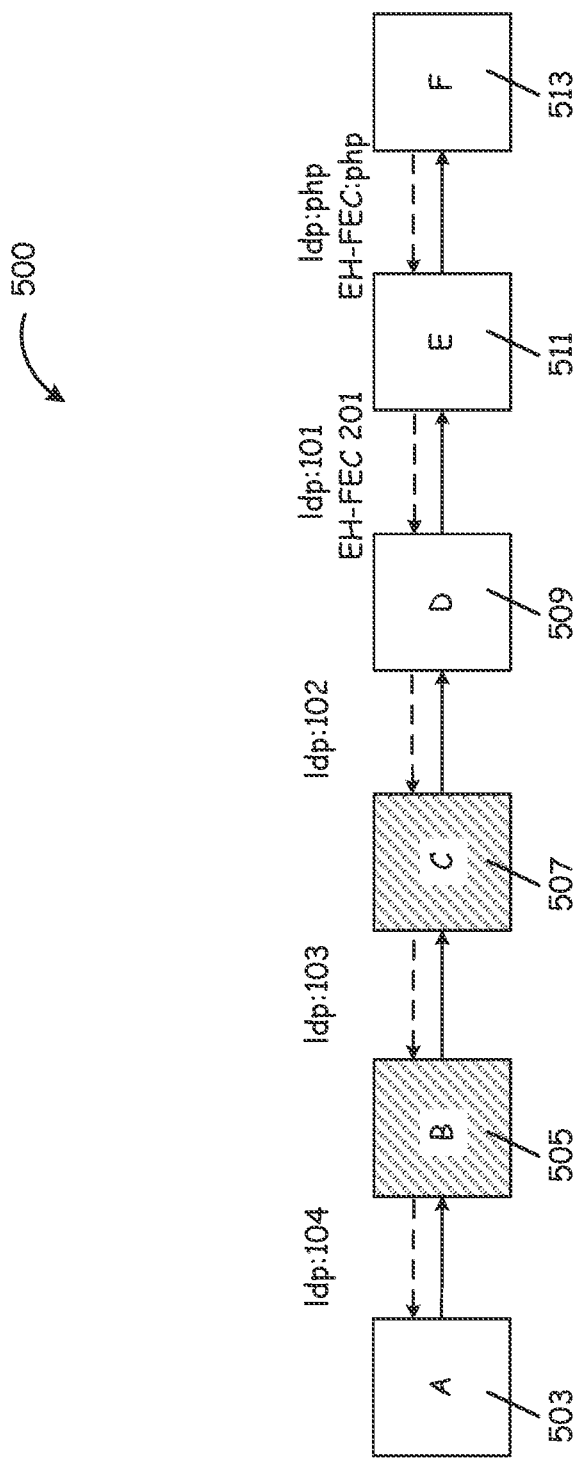
FIG. 5 is a diagram illustrating a mixed MPLS network including both EH capable and EH non-capable nodes, in accordance with various embodiments of the present disclosure.

Referring next to FIG. 5, a diagram illustrating a mixed MPLS network 500 including both EH capable and EH non-capable nodes will be discussed in accordance with various embodiments of the present disclosure. Mixed MPLS network 500 is a simplified representation of a portion of network 200 (FIG. 2) that includes EH capable nodes 503, 509, 511, and 513, intermixed with EH non-capable nodes 505 and 507 (designated by shading). Nodes further left in FIG. 5 represent upstream nodes, and nodes further right in FIG. 5 represent downstream nodes.

Each of the EH capable nodes in Mixed MPLS network 500 knows whether immediately adjacent nodes are EH capable or EH non-capable, based on the advertised capabilities of each node. The nodes illustrated in FIG. 5 are, in at least one embodiment, Label Switching Routers (LSRs) or other devices capable of processing and forwarding packets using MPLS techniques.

In at least one embodiment, each of the nodes advertises its capabilities to other nodes in the mixed MPLS network 500 using advertising techniques commonly used in MPLS networks. In at least one embodiment, each node will advertise its capabilities by transmitting information about its own forwarding equivalence class (FEC) to its upstream neighbor. For example, node 513 will advertise its FEC capabilities to node 511, node 511 will advertise its capabilities to node 509, node 509 will advertise its capabilities to node 507, node 507 will advertise its capabilities to node 505, and node 505 will advertise its capabilities to node 503.

Advertising capabilities includes, in at least one embodiment, advertising either single or dual FEC labels. An EH capable node will advertise dual FEC labels to other EH capable nodes, but will advertise only a single FEC label to EH non-capable nodes. For example, node 513 will advertise label distribution protocol (LDP) label: ldp:php to node 511. This label which indicates that node 513 is the last node in a particular defined LDP pathway, and that node 513 can process packages having standard LDP labels in the MPLS label stack. Node 513 will also advertise FEC label: EH-FEC:php to node 511, which indicates both that node 513 is the last node in the particular defined LDP pathway, and that node 513 is EH capable.

Continuing with the previous example, node 511 will advertise label ldp:101 to node 509 which indicates the position of node 511 within the MPLS pathway, and further indicates that node 513 can process packages having standard LDP labels. Node 511 will also advertise label EH-FEC:201, which indicates the position of node 511 within the MPLS pathway, and that node 511 is EH capable.

At this point, note that node 507 is EH non-capable, and thus it does not matter to node 507 whether node 509 is EH capable, because node 507 does not have EH processing capabilities. Thus, EH capable node 509 advertises label to node 507: ldp:102, but not an EH-FEC label. Similar to earlier parts of this example, the LDP label indicates the position of node 509 within the MPLS pathway, and indicates that node 513 can process packages having standard LDP labels. In a similar manner, node 507 advertises label ldp:103 to node 505, and node 505 advertises label ldp:104 to node 503. Of note is that even though node 503 is EH capable, node 505 is not EH capable, and thus does not advertise EH capabilities to node 503.

In some embodiments, EH capable node 509 can attempt to advertise dual labels to node 507, but node 507 will simply ignore the label indicating EH capabilities. In alternative embodiments, node 507 can receive both the LDP and EH labels, and place both the LDP and EH label information into a table used for label mapping. But because node 507 is EH non-capable, node 507 will essentially ignore the advertised EH label when preparing packets for transmission. In yet other embodiments, each of the nodes in the mixed MPLS network 500, e.g. nodes 503, 505, 507, 509, 511, and 513, can advertise its capabilities to the upstream node via a centralized controller tasked with providing advertised capabilities to the individual nodes. In some such embodiments, messages including capabilities information are transmitted from the individual nodes to the controller, the controller passes the information to the upstream node, and the upstream node inserts that information into a lookup table mapping the capabilities with the downstream node. In yet other embodiments, a centralized controller generates label mappings and transmits those label mappings and/or lookup tables including the mapping to the appropriate node.

In various implementations, individual nodes can be provided with information about the basic EH capabilities of neighboring nodes, both upstream and downstream, so that each node can know in advance whether to advertise single or dual FEC labels. Various techniques for passing information between nodes can be used, including techniques not specific to MPLS. However, unless otherwise indicated, reference herein to "advertising capabilities" is intended to refer to capability-advertising techniques commonly used to advertise MPLS labels or label mapping information.

Having been provided with information about the advertised capabilities of downstream nodes, for example through an MPLS advertising process, a packet can be transmitted through mixed MPLS network 500 using that information. Because the information about advertised capabilities is provided prior to processing and routing packages through mixed MPLS 500, the nodes are said to be preconfigured with the advertised capabilities of neighboring, downstream nodes. In some embodiments, the preconfiguring the nodes includes storing label information indicating EH capabilities in a table used by each node to determine which ports to use for transmission, which labels can or cannot be added to the MPLS label stack, or the like.

Consider, first, the following example of a message being transmitted via mixed MPLS network 500. A packet, such as packet 400 (FIG. 4), includes an extension header, and is received at node 503 for transmission through mixed MPLS network 500 to node 513. In this example, the packet includes an extension header (EH), and the EH label is located at the bottom of the MPLS stack to provide backward compatibility with EH non-capable nodes 505 and 507. Because node 503 is an EH capable device, node 503 will scan the entire MPLS label stack to identify the EH label, and will perform any in-network services specified by the EH.

The MPLS label stack includes a label that node 503 uses to cross reference data included in a lookup table, which includes label mappings. Node 503 can use the lookup table to determine that the next hop for the packet is to node 505. Node 503 can also use the label mappings included in the lookup table to determine that a standard LDP label will need to be at the top of the MPLS label stack before the packet is transmitted to node 505, because node 505 is EH non-capable. In some cases, node 503 will insert the standard LDP label. In other cases the LDP label may already be present in the MPLS label stack, and node 503 will expose the LDP label by removing a label positioned higher in the MPLS label stack. In any event, in this example node 503 will configure the packet so that a standard LDP label is at the top of the MPLS label stack, and transmit the packet to node 503.

Node 505 receives the packet, which includes an EH and an EH label at the bottom of the MPLS label stack. Note that node 505 is EH non-capable, and so will process the packet as a standard MPLS packet, in accordance with the standard LDP label. To forward the packet to the next hop along the LDP path, node 505 will cross reference the LDP label with a lookup table including routing information related to node 507, possibly popping the top label off the MPLS label stack and pushing a new LDP label onto the MPLS stack, popping off the top label and leaving an underlying LDP label on top of the stack, or even leaving the same LDP label on top of the MPLS stack in some instances. In any case, because node 505 is EH non-capable, node 505 will transmit the packet to node 507 with a standard LDP label at the top of the MPLS label stack.

Node 507 will process the packet in a manner similar to the manner in which node 505 processed the packet, and sent the packet to node 509. Recall that node 509 advertised to node 507 only standard LDP capabilities, so even though there is an EH included in the packet, node 507 sends the packet with a standard LDP label.

When node 509 receives the packet, the packet will include a standard LDP label. Because node 509 is EH capable, it will scan the MPLS label stack from top to bottom, looking for an EH label, which it will find at the bottom of the MPLS stack. Node 509 will then perform any in-network services specified by the EH, and then add a new label to the top of the MPLS label stack. Recall that node 511 advertised EH capabilities to node 509, so node 509 will add the appropriate label to the top of the MPLS label stack. In this example, because the packet includes an EH, node 509 will place a standard LDP label on top of the MPLS label stack.

Node 511, an EH capable node, will process the packet, including the EH, in the same manner as node 509, and forward the packet to node 513 with a standard LDP label on top of the MPLS stack. Node 513 will process the packet, including the EH, in the same way, except that because node 513 is the last node in the LDP path, node 513 can remove the MPLS label stack.

Contrast the first example above, in which the packet being transmitted via mixed MPLS network 500 includes an EH, with the following example, in which a message being transmitted via mixed MPLS network 500 does not include an EH. Because node 503 is an EH capable device, node 503 will scan to the bottom of the MPLS label stack in an effort to find an EH label, but will not find one. Node 503 will use a lookup table to determine that the next hop for the packet is to node 505, and that because node 505 is EH non-capable, the top label in the MPLS stack will need to be a standard LDP label. Node 503 will configure the packet so that that a standard LDP label is at the top of the MPLS label stack, and transmit the packet to node 503.

Node 505 receives the packet, which does not include an EH. Note that node 505 is EH non-capable, and so will process the packet as a standard MPLS packet (which, in fact, it is because it does not include an EH), and transmit the packet to node 507 with a standard LDP label at the top of the MPLS label stack. Node 507 will process the packet in a manner similar to the manner in which node 505 processed the packet, and sent the packet to node 509.

As in the previous example, when node 509 receives the packet, the packet will include a standard LDP label. Because node 509 is EH capable, it will scan the MPLS label stack from top to bottom, looking for an EH label, which it will not find. Recall that node 511 advertised EH capabilities to node 509, so node 509 will add the appropriate label to the top of the MPLS label stack. In this example, because the packet does not include an EH, node 509 will push an EH label onto the MPLS label stack before transmitting the packet to node 511. This differs from the previous example, in which node 509 pushed a standard LDP label on top of the MPLS label stack because an EH was present in the packet. Note that, in this example, an EH label is inserted into the MPLS label stack to assert that there is no EH present in the packet, while a standard LDP label is used if there is an EH present.

At this point, the EH label will provide a processing savings by permitting node 511, to bypass a full scan of the MPLS label stack. Node 511 knows that there is no EH in the packet, so there is no need for node 511 to scan the label stack in search of an EH. Because node 511 knows that node 513 is an EH capable device, node 511 will insert an EH label, in this case EH-FEC:php, onto the at the MPLS stack before transmitting the packet to node 513. Upon receipt of the packet, node 513 the presence of the EH label inserted by node 511 allows node 513 to avoid unnecessarily scanning the full MPLS label stack in an attempt to find an EH that is not present in the packet.

As illustrated by the above examples, even though using an EH label indicating "no EH present" may not prevent all unnecessary scans of the MPLS labels stack, using such an EH label in accordance with the present disclosure can prevent enough unnecessary scans in a mixed network to improve system performance, as compared to not using an EH label indicating "no EH present."

Figures 6, 7:
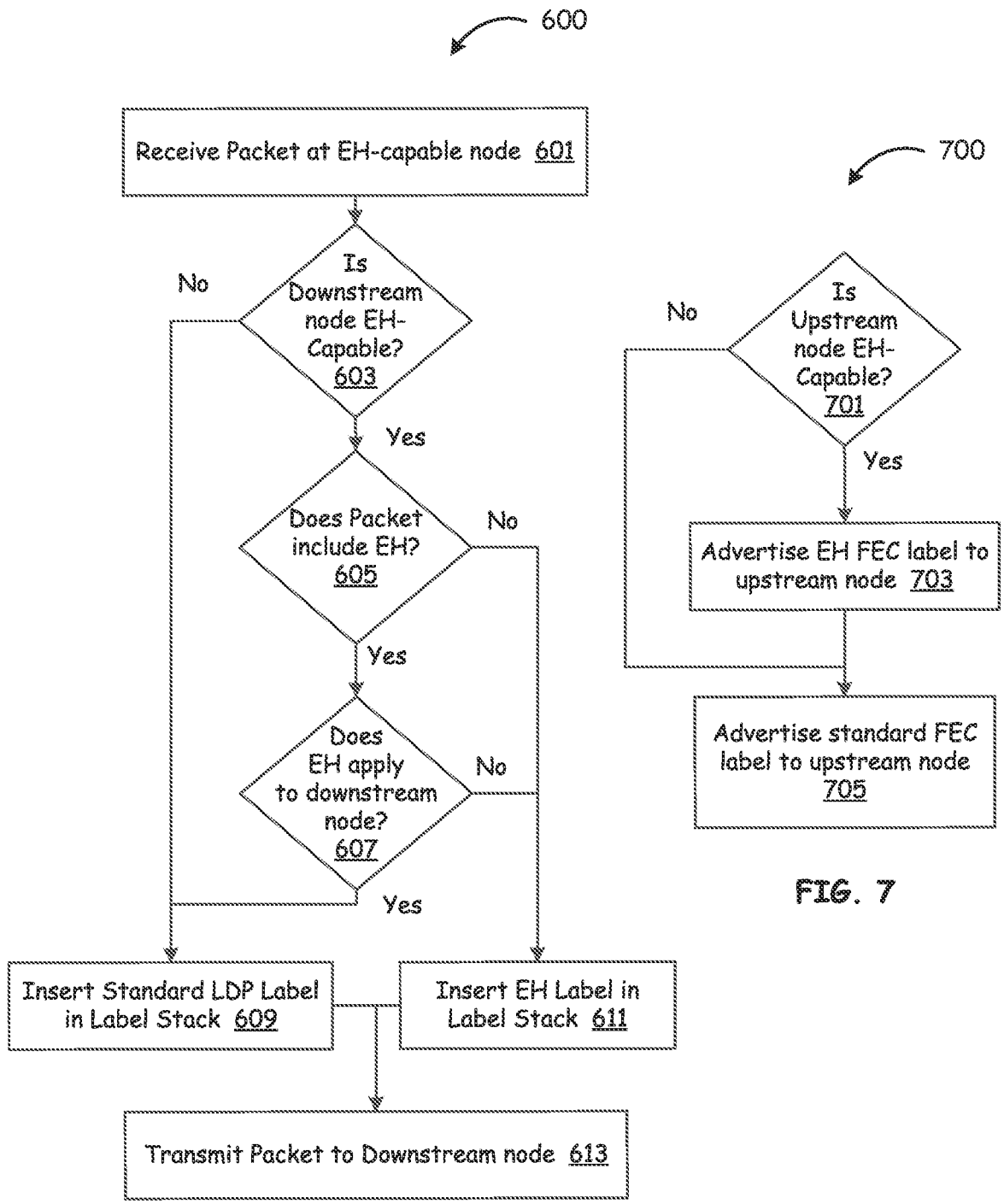
FIG. 6 is a flow chart illustrating conditional insertion of EH labels into an MPLS label stack, in accordance with various embodiments of the present disclosure.
FIG. 7 is a flow chart illustrating advertisement of labels in a mixed MPLS network including both EH capable and EH non-capable nodes, in accordance with various embodiments of the present disclosure.

Referring next to FIG. 6, a flow chart illustrating a method 600 that includes conditional insertion of EH labels into an MPLS label stack will be discussed in accordance with various embodiments of the present disclosure.

As illustrated by block 601, a packet is received at an EH capable node. The node receiving the packet determines whether the node immediately downstream from the receiving node is EH capable, as illustrated by block 603. In at least one embodiment, this determination is made based on advertised capabilities of the downstream node by, for example, consulting a lookup table linking the downstream node to particular FEC labels.

If it is determined at block 603 that the downstream node is EH non-capable, a standard LDP label is inserted into the MPLS label stack, as indicated by block 609. If, however, the downstream node is determined to be EH capable at block 603, another check is made to determine whether the packet includes one or more extension headers (EHs), as illustrated at block 605.

If it is determined at block 605 that the packet does not include one or more EHs, an EH label indicating that no EHs are present in the packet is inserted into the MPLS label stack, as shown by block 611. If however, the downstream node is EH capable, and the packet does include an EH, then the receiving node performs another check at block 607 to determine whether the EH applies to the downstream node. If the EH does not apply to the downstream node, an EH label indicating that no EHs are present in the packet is inserted into the MPLS label stack, as shown by block 611. If, however, the EH does apply to the downstream node, a standard LDP label is inserted into the MPLS label stack, as indicated by block 609.

After conditionally inserting either the EH label or the standard LDP label into the MPLS label stack, the packet is transmitted to the downstream node, as illustrated by block 613.

Referring next to FIG. 7, a flow chart illustrating a method 700 of advertising labels in a mixed MPLS network, including both EH capable and EH non-capable nodes, will be discussed in accordance with various embodiments of the present disclosure. As illustrated by block 701, a check is made to determine whether the upstream mode is EH capable. This check can be performed by an EH capable node based on a network configuration table or information received via an MPLS network, based on direct or indirect communications between the downstream node and the upstream node, by an MPLS controller, or by some combination thereof.

As illustrated by block 703, if the upstream node is EH capable, an EH FEC label is advertised to the upstream node. As illustrated by block 705, if the upstream node is EH non-capable, a standard FEC label can be advertised to the upstream node.

Advertisement of either standard or EH labels can be performed by a network controller on its own behalf, by a network controller on behalf the downstream EH capable node, using MPLS advertisement protocols, etc. In some embodiments, various protocols such as LDP Downstream on Demand (DoD) or Downstream Unsolicited (DU), Resource Reservation Protocol for Traffic Engineering (RSVP-TE), an interior gateway protocol (IGP) or a centralized controller can be used to create label mappings between the nodes in an EH capable network, or in a mixed network including both EH capable nodes and EH non-capable nodes.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed disclosure. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the disclosure. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an disclosure is not limited by the particular examples disclosed herein and expressly incorporates these other combinations.

What is claimed is:

1. A method by a first extension header (EH) capable node in a Multiprotocol Label Switching (MPLS) network including both EH capable nodes and EH non-capable nodes, the method comprising:
   receiving advertised capabilities of a downstream node within the MPLS network, the advertised capabilities indicating whether the downstream node is an EH capable node;
   receiving a packet to be transmitted to the downstream node via the MPLS network;
   determining whether the packet includes an extension header (EH); and
   inserting an EH label into an MPLS label stack of the packet after determining the advertised capabilities of the downstream node indicate that the downstream node is EH capable and the packet does not include the EH.

2. The method of claim 1, further comprising:
   inserting a standard label distribution protocol (LDP) label into the MPLS label stack of the packet after determining the downstream node is EH capable and the packet includes the EH.

3. The method of any of claim 1, wherein the EH label asserts that no EH is present in the packet.

4. The method of claim 3, further comprising:
   hiding the EH from the downstream node by inserting the EH label into the MPLS label stack of the packet after determining the downstream node is EH capable, the packet includes the EH, and the EH does not apply to the downstream node.

5. The method of claim 4, further comprising:
   inserting a standard label distribution protocol (LDP) label into the MPLS label stack of the packet after determining the downstream node is EH non-capable, regardless of whether the packet includes the EH.

6. The method of claim 4, further comprising:
   scanning an entire MPLS label stack to determine whether the packet includes the EH.

7. The method of claim 6, wherein the downstream node is an EH capable node, the method further comprising:
   receiving at least one message from the downstream node, within the MPLS network, advertising dual forwarding equivalence class (FEC) labels, wherein:
   a first FEC label indicates that the downstream node is capable of processing packets including standard LDP labels; and
   a second FEC label indicates that the downstream node is capable of processing packets including EH labels.

8. The method of claim 7, wherein the first EH capable node is downstream from an upstream EH capable node, the method further comprising:
   transmitting at least one message from the first EH capable node to the upstream EH capable node, the at least one message advertising dual forwarding equivalence class (FEC) labels.

9. The method of claim 7, wherein the first EH capable node is downstream from an upstream EH non-capable node, the method further comprising:
   transmitting a message from the first EH capable node to the upstream EH non-capable node, the at least one message advertising a single (FEC) label.

10. The method of claim 9, wherein receiving the advertised capabilities includes:
    receiving the advertised capabilities from a network controller.

11. The method of claim 9, wherein receiving the advertised capabilities includes:
    receiving the advertised capabilities from the downstream node.

12. The method of claim 10, further comprising:
    inserting the EH label into the MPLS label stack of the packet by using a forwarding equivalence class (FEC) label associated with the advertised capabilities of the downstream node as an index into a lookup table.

13. A Multiprotocol Label Switching (MPLS) network comprising:
    a plurality of extension header (EH) capable Label Switching Routers (LSRs);
    at least one EH non-capable LSR coupled to the plurality of EH capable LSRs;

a first EH capable LSR configured to:
   receive an advertisement message indicating whether a downstream LSR is EH capable;
   receive a packet to be transmitted to the downstream LSR;
   determine whether the packet includes one or more extension headers (EHs); and
   insert an EH label into an MPLS label stack of the packet after determining advertised capabilities of the downstream LSR indicate that the downstream LSR is EH capable and the packet does not include the one or more EHs.

14. The Multiprotocol Label Switching (MPLS) network of claim 13, wherein the first EH capable LSR is configured to:
   insert a standard label distribution protocol (LDP) label into the MPLS label stack of the packet after determining the downstream LSR is EH capable and the packet includes the one or more EHs.

15. The Multiprotocol Label Switching (MPLS) network of claim 13, wherein the first EH capable LSR is configured to:
   hide the one or more EHs from the downstream LSR by inserting the EH label into the MPLS label stack of the packet after determining the downstream LSR is EH capable, the packet includes the one or more EHs, and the one or more EHs do not apply to the downstream LSR.

16. The Multiprotocol Label Switching (MPLS) network of claim 15, wherein the first EH capable LSR is configured to:
   insert a standard label distribution protocol (LDP) label into the MPLS label stack of the packet after determining the downstream LSR is EH non-capable, regardless of whether the packet includes the one or more EHs.

17. The Multiprotocol Label Switching (MPLS) network of claim 16, wherein the first EH capable LSR is configured to:
   scan an entire MPLS label stack to determine whether the packet includes the one or more EHs.

18. The Multiprotocol Label Switching (MPLS) network of claim 17, wherein the downstream LSR is an EH capable LSR, and the first EH capable LSR is configured to:
   receive at least one message from the downstream LSR advertising dual forwarding equivalence class (FEC) labels, wherein:
   a first FEC label indicates that the downstream LSR is capable of processing packets including standard LDP labels; and
   a second FEC label indicates that the downstream LSR is capable of processing packets including EH labels.

19. The Multiprotocol Label Switching (MPLS) network of claim 18, wherein the first EH capable LSR is downstream from an upstream EH capable LSR, and the first EH capable LSR is configured to:
   transmit at least one message from to the upstream EH capable LSR, the at least one message from the downstream LSR advertising dual forwarding equivalence class (FEC) labels.

20. The Multiprotocol Label Switching (MPLS) network of claim 18, wherein the first EH capable LSR is downstream from an upstream EH non-capable LSR, and the first EH capable LSR is configured to:
   transmit a message to the upstream EH non-capable LSR, the at least one message advertising a single (FEC) label.

21. The Multiprotocol Label Switching (MPLS) network of claim 20, the first EH capable LSR is configured to:
   insert the EH label into the MPLS label stack of the packet includes using at least one of the advertised FEC labels as an index into a lookup table.

22. An extension header capable (EH capable) Label Switching Router (LSR) comprising:
   a processor and associated memory;
   at least one interface coupled to the processor and associated memory, the at least one interface configured to receive and transmit packets of data to other Label Switching Routers (LSRs) included in a Multiprotocol Label Switching (MPLS) network;
   the processor and associated memory configured to:
      receive an advertisement message indicating whether a downstream LSR is extension header capable (EH capable);
      receive a packet to be transmitted to the downstream LSR;
      determine whether the packet includes one or more extension headers (EHs); and
      insert an EH label into an MPLS label stack of the packet after determining the downstream LSR is EH capable and the packet does not include the one or more EHs.

23. The extension header capable (EH capable) LSR of claim 22, the processor and associated memory further configured to:
   hide the one or more EHs from the downstream LSR by inserting the EH label into the MPLS label stack of the packet after determining the downstream LSR is EH capable, the packet includes the one or more EHs, and the one or more EHs do not apply to the downstream LSR.

24. The extension header capable (EH capable) LSR of claim 22, the processor and associated memory further configured to:
   scan an entire MPLS label stack to determine whether the packet includes the one or more EHs.

25. The extension header capable (EH capable) LSR of claim 24, wherein the downstream LSR is an EH capable LSR, and the at least one interface is configured to:
   receive at least one message from a downstream LSR advertising dual forwarding equivalence class (FEC) labels, wherein:
   a first FEC label indicates that the downstream LSR is capable of processing packets including standard LDP labels; and
   a second FEC label indicates that the downstream LSR is capable of processing packets including EH labels.

26. The extension header capable (EH capable) LSR of claim 25, wherein the processor and associated memory are further configured to:
   insert the EH label into the MPLS by using at least one of the advertised FEC labels as an index into a lookup table.

* * * * *

UNITED STATES PATENT AND TRADEMARK OFFICE
CERTIFICATE OF CORRECTION

PATENT NO. : 11,888,734 B2
APPLICATION NO. : 17/170318
DATED : January 30, 2024
INVENTOR(S) : Guichard et al.

It is certified that error appears in the above-identified patent and that said Letters Patent is hereby corrected as shown below:

In the Claims

• Column 22, Line 9 (Claim 3, Line 1): please replace "of any of claim" with --of claim--

Signed and Sealed this
Ninth Day of April, 2024

Katherine Kelly Vidal
*Director of the United States Patent and Trademark Office*